United States Patent
Shukuri et al.

(10) Patent No.: US 7,967,358 B2
(45) Date of Patent: Jun. 28, 2011

(54) FOOTREST FOR VEHICLE

(75) Inventors: Hidemasa Shukuri, Wako (JP); Hideto Nebuya, Wako (JP); Ken Muto, Wako (JP); Takuya Shirahata, Wako (JP); Takayuki Hira, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/681,815

(22) PCT Filed: Nov. 7, 2008

(86) PCT No.: PCT/JP2008/070725
§ 371 (c)(1),
(2), (4) Date: Apr. 6, 2010

(87) PCT Pub. No.: WO2009/066614
PCT Pub. Date: May 28, 2009

(65) Prior Publication Data
US 2010/0230990 A1 Sep. 16, 2010

(30) Foreign Application Priority Data
Nov. 22, 2007 (JP) .................................. 2007-303083

(51) Int. Cl.
*B60N 3/06* (2006.01)

(52) U.S. Cl. ................. 296/75; 296/187.05; 296/187.08
(58) Field of Classification Search ............ 296/187.05, 296/187.08, 193.07, 75; 74/564
See application file for complete search history.

(56) References Cited

U.S. PATENT DOCUMENTS

| 4,010,975 A * | 3/1977 | Horton ............................ 296/75 |
| 6,761,389 B2 * | 7/2004 | Honda et al. ................... 296/75 |
| 7,055,893 B2 * | 6/2006 | Yamamura et al. ...... 296/187.08 |
| 2002/0096904 A1 | 7/2002 | Matsushita |

FOREIGN PATENT DOCUMENTS

| JP | 11-020533 | 1/1999 |
| JP | 2001-163107 | 6/2001 |

* cited by examiner

*Primary Examiner* — Jason S Morrow
(74) *Attorney, Agent, or Firm* — Rankin, Hill & Clark LLP

(57) ABSTRACT

A vehicular footrest includes a footrest part (36) for making contact with a foot (F) of a vehicle occupant (M), and a footrest base member (34). The footrest has a front surface load absorption mechanism (33) for absorbing a load applied to a firewall (23), and a lower limb load absorption mechanism (35) for absorbing a load applied from a vehicle occupant to the footrest part (36).

2 Claims, 6 Drawing Sheets

FOOTREST FOR VEHICLE

TECHNICAL FIELD

The present invention relates to a footrest for a vehicle.

BACKGROUND ART

Japanese Patent No. 3816193 discloses a footrest for a vehicle in which a foot support plate having a surface on which a foot of a vehicle occupant rests is mounted on a front partition of the passenger compartment using a footrest part, and deformation that occurs when the front partition deforms toward the passenger compartment is absorbed by the footrest part, whereby the rising up of the foot support plate is reduced.

Japanese Patent No. 3695267 discloses a footrest for a vehicle in which a plate having a surface on which a foot of a vehicle occupant rests is mounted on a front partition of the passenger compartment using energy absorption means, and collision energy that is produced when the front partition deforms toward the passenger compartment is absorbed by the energy absorption means.

However, in the footrests disclosed in Japanese Patents No. 3816193 and 3695267, the load generated by the deformation of the front partition must be transmitted to the footrest part and the energy absorption means in order to allow the deformation of the front partition caused by another vehicle to be adequately absorbed by the footrest part or the energy absorption means. There are problems in that the front partition may or may not deform depending on the mode of the collision, the structure of a counterpart vehicle, and other complex factors, and it is difficult to design a structure of a front part of a vehicle body (front body) in which the footrest part or the energy absorption means is constantly made to function.

DISCLOSURE OF THE INVENTION

An object of the present invention is to provide a footrest for a vehicle capable of absorbing a load applied to a leg disposed on the footrest regardless of the position of the vehicle front surface to which the load has been applied, wherein the footrest facilitates the design of a vehicle body.

According to the present invention, there is provided a footrest for a vehicle, which comprises: a footrest part for making contact with a foot of a vehicle occupant; a footrest base member for supporting the footrest part on a front partition of a passenger compartment, the footrest base member having one end part adapted to be mounted on a tunnel part convexly formed in a center of the front partition and an opposite end part continuing from the one end part, a front surface load absorption mechanism adapted to connect the opposite end part of the footrest base member to the front partition so as to absorb a load applied to the front partition; and a lower limb load absorption mechanism for supporting the footrest part on the opposite end part of the footrest base member and absorbing a load applied from the vehicle occupant to the footrest part.

When a load produced by another vehicle is applied to the front surface of the vehicle, even if the load (impact) is absorbed by the front part of the vehicle, the vehicle occupant in a driver's seat is pushed forward, and a load (force pressing on the footrest) is generated in a leg (foot) on the footrest. However, the lower limb load absorption mechanism deforms in relation to the load applied by the leg, whereby the force applied to the leg can be absorbed.

The front surface load absorption mechanism deforms to allow the load to be absorbed according to a relation in which the front part of the vehicle deforms together with the front partition when a load produced by another vehicle has been applied to the front surface of the vehicle.

In this manner, the front surface load absorption mechanism may not function depending on the relation with the other vehicle, but the load can be absorbed by the lower limb load absorption mechanism. Specifically, the load applied to the leg disposed on the footrest can be absorbed regardless of the position of the vehicle front surface to which the load has been applied, and as a result, there is an advantage in that the design of a vehicle body can be facilitated.

Preferably, the front surface load absorption mechanism comprises a center connection part adapted to be connected to the front partition and three stay parts rising in three directions from a peripheral edge of the center connection part, each of the three stay parts being coupled to the footrest base member.

Desirably, the end part of the footrest base member comprises a tunnel connection part mounted on the tunnel part.

It is preferable that the lower limb load absorption mechanism comprise two brackets each having a pair of leg parts formed in a V-shape. The leg parts may be interposed between the footrest base member and the footrest part and have elasticity so as to absorb a load.

BEST MODE FOR CARRYING OUT THE INVENTION

A preferred embodiment of the present invention will be described in detail hereinafter with reference to the accompanying drawings.

Figure 1:
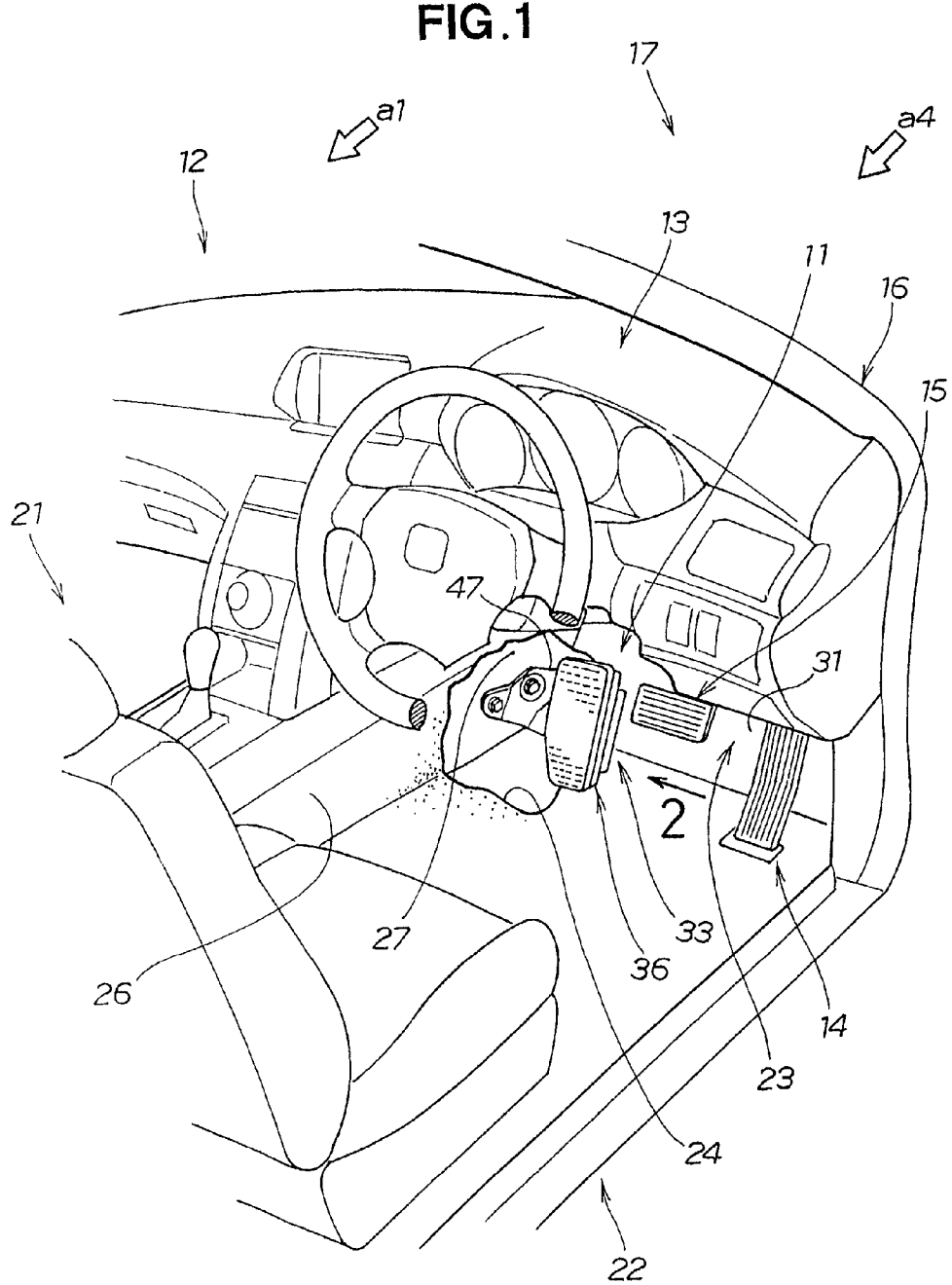
FIG. 1 is a perspective view showing an interior of a vehicle carrying a footrest according to the present invention.

In FIG. 1, a footrest 11 for a vehicle is used in a driver area 13 of a vehicle 12, and is one in which the left foot of a driver is disposed.

The vehicle 12 is provided with an accelerator pedal 14 disposed in the lower right of the driver area 13, a brake pedal 15 disposed in the lower center, and the footrest 11 disposed on the lower left. Furthermore, the vehicle 12 is provided with a front body 17 that constitutes a front part of a vehicle body 16, an underbody 22 that constitutes a floor of a passenger compartment 21, a firewall 23 that connects to the front part of the underbody 22 and acts as a front partition that provides a partition from the front body 17, and a floor mat 24 attached to the underbody 22 and the firewall 23.

A center tunnel part 26 is formed in the center of the underbody 22 so as to extend into the passenger compartment 21; a dashboard tunnel part 27, which acts as a tunnel part, is linked to a center tunnel part 26 and formed below the firewall 23; and the footrest for a vehicle (footrest) 11 is mounted on the dashboard tunnel part 27.

Figure 2:
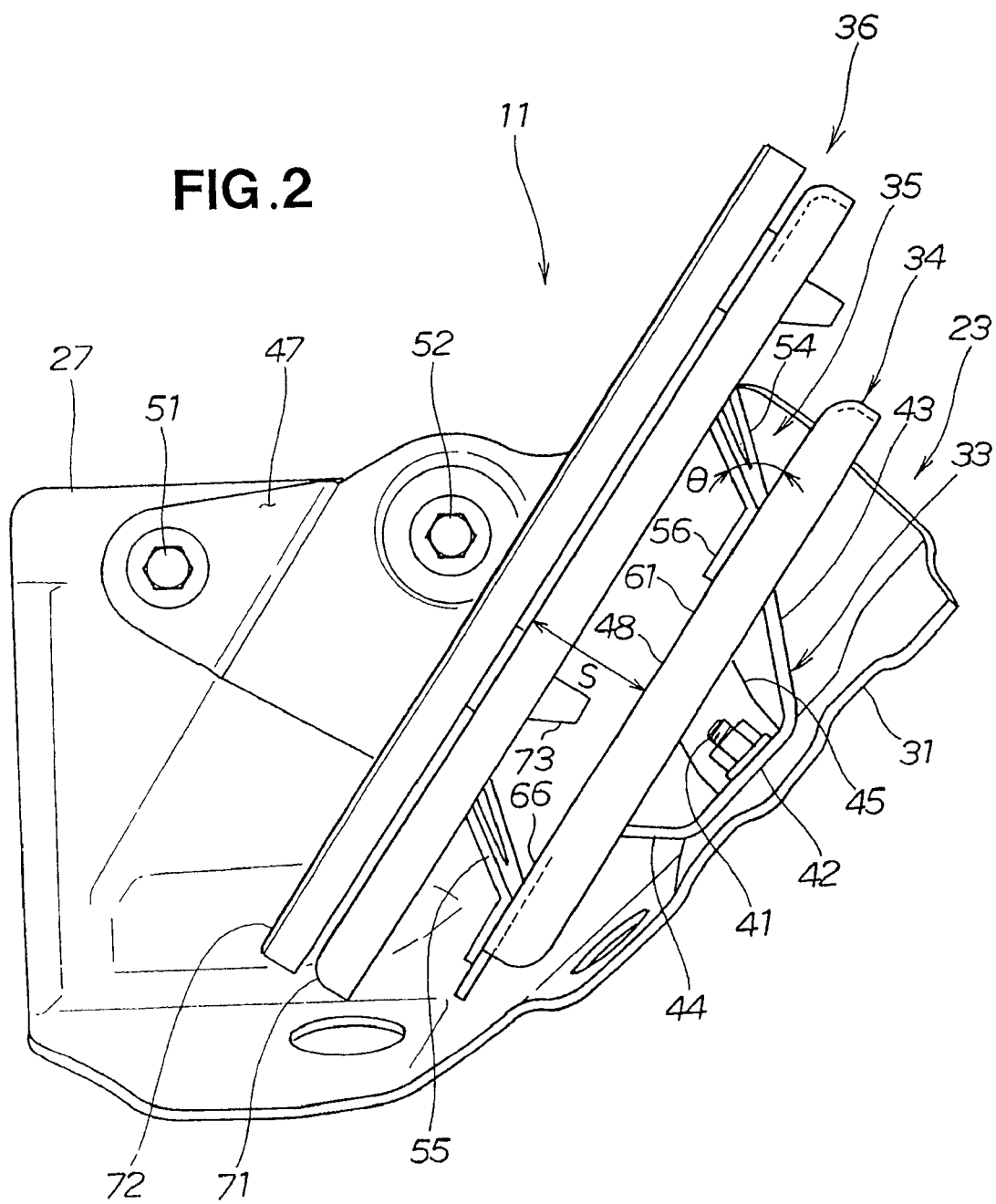
FIG. 2 is a schematic view showing on an enlarged scale the footrest as seen in the direction of arrow 2 of FIG. 1.

As shown in FIG. 2, the footrest 11 is provided with a front surface load absorption mechanism 33 mounted on an inclined part 31 of the lower part of the firewall 23, a footrest base member 34 integrally disposed on the front surface load absorption mechanism 33, a lower limb load absorption mechanism 35 mounted on the footrest base member 34, and a footrest part 36 disposed on the lower limb load absorption mechanism 35.

Figure 3:
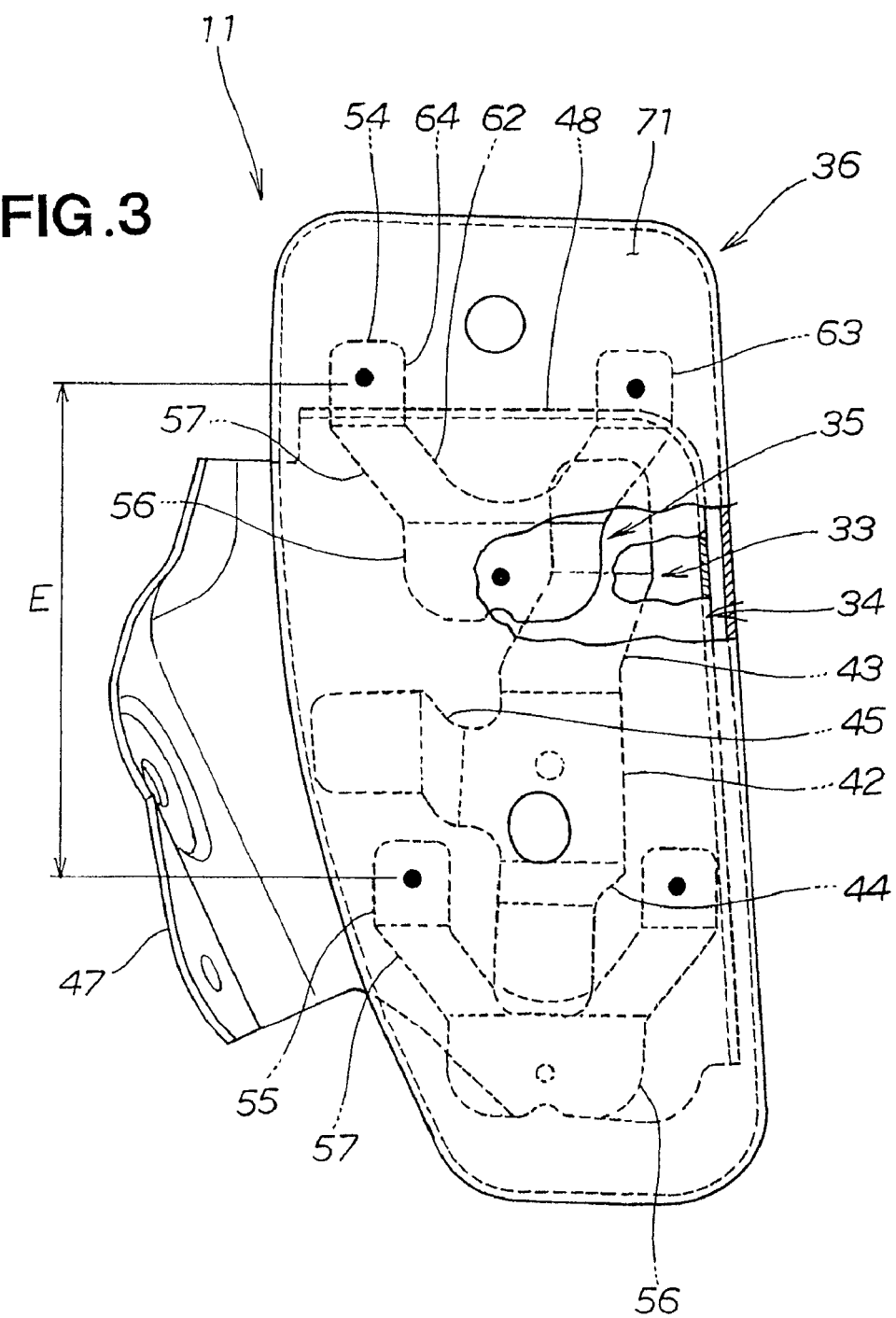
FIG. 3 is a top plan view of the footrest shown in FIG. 2.
Figure 4:
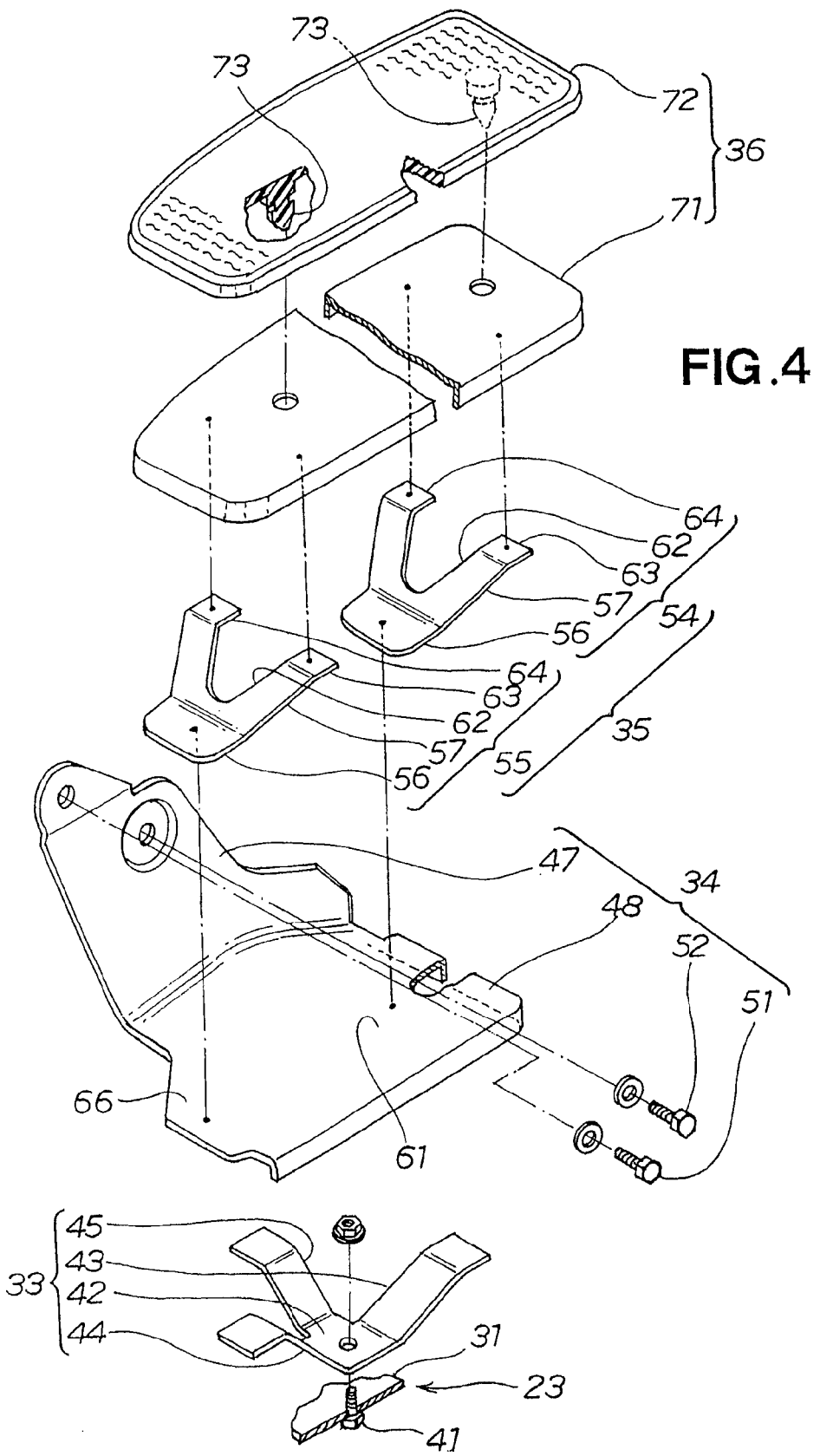
FIG. 4 is an exploded view of the footrest shown in FIG. 2.

As shown in FIGS. 3 and 4, the front surface load absorption mechanism 33 has a center connection part 42 fastened with the aid of a first bolt 41 to the inclined part 31 of the firewall 23, a first stay part 43 erectly disposed on and linked to an upper end of the center connection part 42, a second stay part 44 erectly disposed on and linked to a lower end of the center connection part 42, a third stay part 45 erectly disposed on and linked to an end of the center connection part 42 so as to face the dashboard tunnel part 27, and the footrest base member 34 mounted by welding on the first, second, and third stay parts 43, 44, 45.

The footrest base member 34 comprises a tunnel connection part 47, which acts as an end part mounted on the dashboard tunnel part 27; and a plate 48, which acts as another end part linked to the end part (tunnel connection part) 47.

Specifically, the plate 48 is welded to the first stay part 43, the second stay part 44, and the third stay part 45. The tunnel connection part 47 is formed on an edge part of the plate 48 so as to face the dashboard tunnel part 27. Additionally, the tunnel connection part 47 is in contact with the dashboard tunnel part 27 and is fastened using a second bolt 51 and a third bolt 52. The plate 48 is formed facing the inclined part 31 of the firewall 23 and is substantially parallel to the part. The lower limb load absorption mechanism 35 is mounted on the plate 48.

The lower limb load absorption mechanism 35 comprises a first bracket 54, and a second bracket 55 disposed at a predetermined distance E from the first bracket 54. The mechanism supports the footrest part 36 at a distance S (FIG. 2) from the plate 48 of the footrest base member 34. The distance S provides for lower limb load absorption.

The first bracket 54 has a first coupling part 56 mounted on the plate 48 of the footrest base member 34, and a leg part 57 formed so as to be linked to the first coupling part 56. Additionally, the first coupling part 56 is welded to a center part 61 of the plate 48, and the leg part 57 is welded on one side of the footrest part 36.

The leg part 57 is formed an angle of inclination θ in relation to the plate 48 of the footrest base member 34, and a lightening part 62 is formed substantially in a V-shape in the center thereof, whereby a footrest part 36 is supported by a first receiving part 63 and a second receiving part 64.

The second bracket 55 is similar to the first bracket 54, but the first coupling part 56 is welded to an end part 66 of the plate 48, and the leg part 57 is welded to the other side of the footrest part 36.

The footrest part 36 comprises a main body 71, and a mat part 72 mounted on the main body 71. A cushioning boss 73 is formed on the mat part 72.

The effect of the footrest for a vehicle according to the present invention will be described next with reference to FIGS. 5 and 6.

Figure 5:
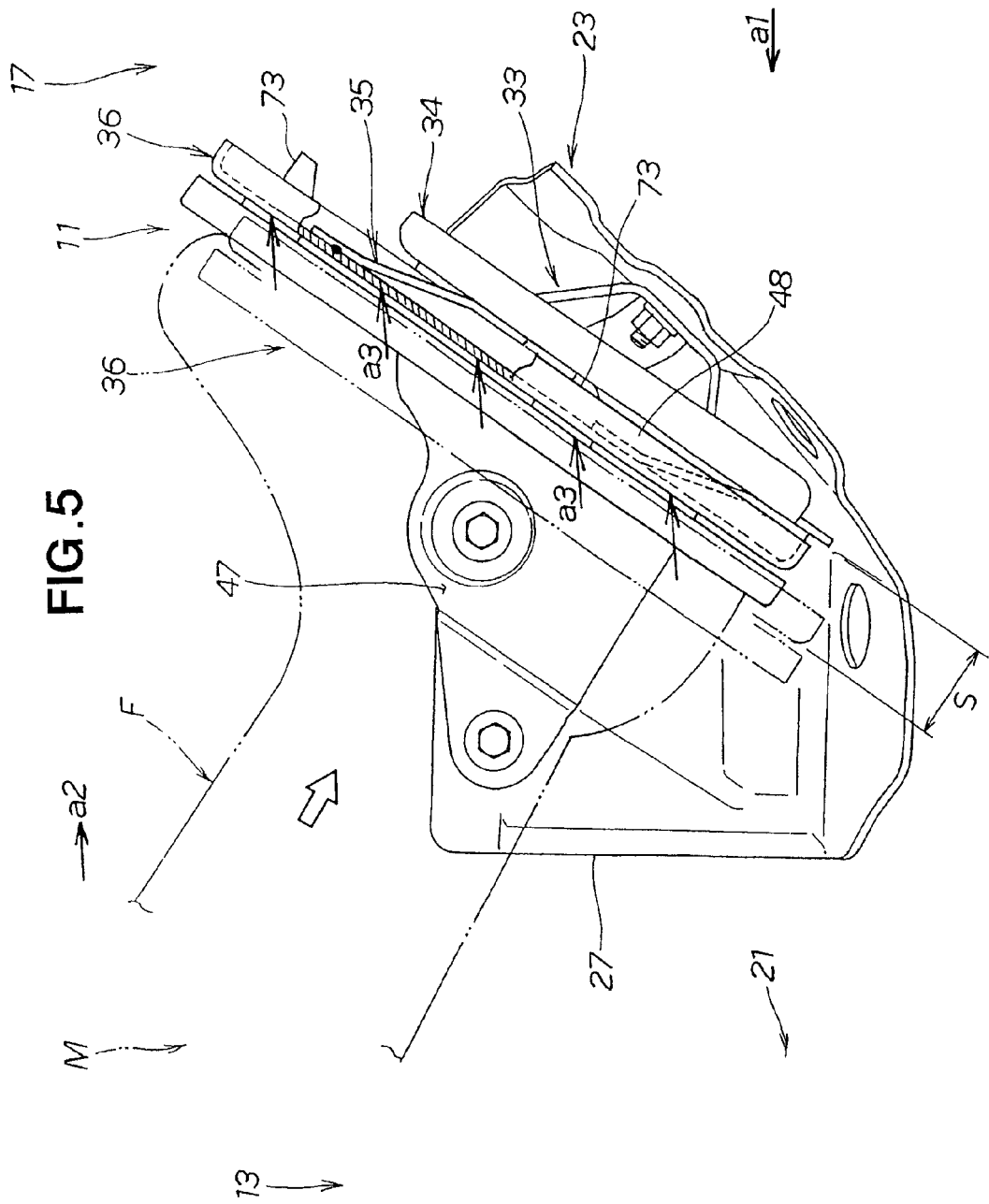
FIG. 5 is a schematic view showing the state of a lower limb load absorption mechanism when a load is applied to the footrest.

As shown in FIG. 5, the vehicle absorbs a load mainly by deformation of the front body 17 when a load is applied on the left by a front surface offset collision in the manner indicated by arrow a1. Furthermore, in the absorption process, a vehicle occupant M, who is the driver, is propelled forward in the manner indicated by arrow a2; therefore, when a leg F (foot) is resting on the footrest 11, a load (force pressing on the footrest 11) is generated on the leg F of the vehicle occupant, and the footrest 11 for a vehicle is pressed by the leg F in the manner shown by arrow a3. However, in such a case, the lower limb load absorption mechanism 35 deforms from a state shown by a two-dot chain line to a state shown by a solid line due to the load applied by the leg F; therefore, a force applied to the leg F of the vehicle occupant M can be absorbed.

Specifically, the front surface load absorption mechanism 33 often does not operate (deform), as shown in FIG. 5, when a load (impact) produced by another vehicle occurs on the left of the vehicle front surface, for example. Also, as shown in FIG. 6, the impact from the front surface is reduced in a state of operation (deformation) of the front surface load absorption mechanism 33, such as when the right side of the vehicle front surface is involved. Therefore, the impact transmitted to the leg F on the footrest 11 is also reduced. However, in the previously described collision mode in which the front surface load absorption mechanism 33 does not operate (deform), the load (force pressing on the footrest 11) generated on the leg F on the footrest 11 tends to increase. When the load (force pressing on the footrest 11) generated on the leg F increases in this manner, the force applied to the leg F can be reduced by the lower limb load absorption mechanism 35.

Specifically, the load applied to the leg F disposed on the footrest 11 can be absorbed regardless of the position of the vehicle front surface to which the load has been applied, and as a result, the design of a vehicle body is facilitated.

Figure 6:
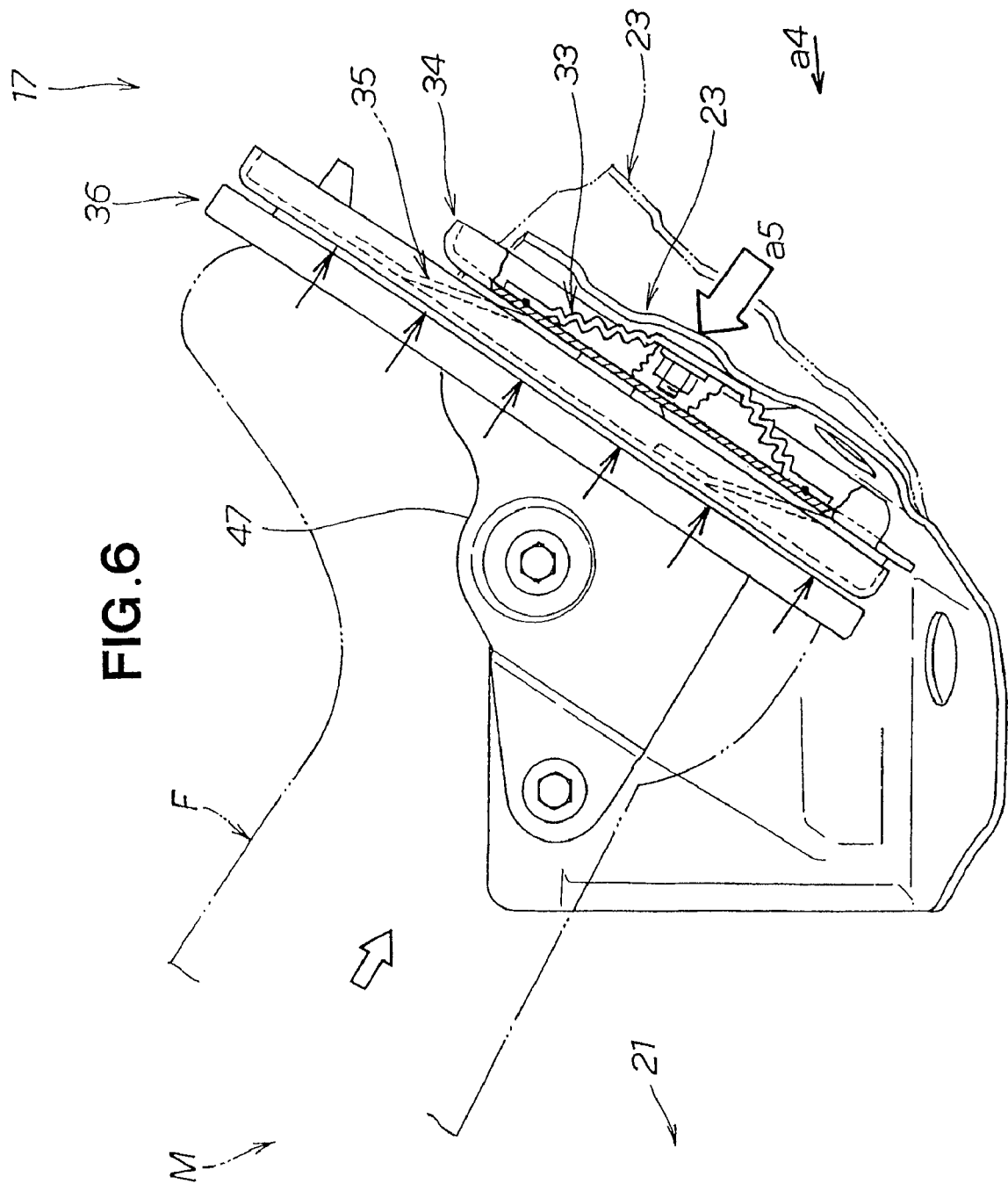
FIG. 6 is a view showing a deformation state of the lower limb load absorption mechanism and the front surface load absorption mechanism when a load has been applied to the footrest and the firewall.

As shown in FIG. 6, when a load is applied to the front surface of the vehicle 12 in the manner indicated by arrow a4, e.g., when there is a front surface offset collision offset on the right of the front surface, the load is primarily absorbed by a deformation of the front body 17. However, depending on the magnitude of the load or the position of the front surface to which the load has been applied, there are cases in which the front partition (firewall) 23 also deforms together with the deformation of the front body 17 from a state shown by a two-dotted chain line to a state shown by a solid line. In such a case, the front surface load absorption mechanism 33 deforms when the front partition (firewall) 23 undergoes deformation and is pressed into the passenger compartment 21, whereby the load applied by the leg F can be reduced.

When the load (force pressing on the footrest 11) generated on the leg F is considerable in spite of the absorption by the front surface load absorption mechanism 33, the lower limb load absorption mechanism 35 undergoes deformation and the force applied to the leg F of the vehicle occupant M can be absorbed as previously described.

Since the lower limb load absorption mechanism 35 has a lightening part 62 formed substantially in a V-shape in the center, the force (stress) applied from the leg F readily increases, making it possible to initiate deformation and to reduce the load generated in the leg F before the load applied to the leg F increases.

Since the lower limb load absorption mechanism 35 comprises the first bracket 54 and the second bracket 55, as shown in FIG. 4, the number of locations supporting the footrest part 36 is increased, the center gravity of the footrest part 36 can be prevented from becoming offset, and the support of the footrest part 36 can be stabilized.

Since the lower limb load absorption mechanism 35 has a lightening part 62 formed substantially in a V-shape in the center, the lower limb load absorption mechanism 35 can be made more lightweight while the center gravity of the footrest part 36 is prevented from becoming offset.

In the lower limb load absorption mechanism 35, the first bracket 54 and the second bracket 55 have the same configuration. Therefore, the manufacturing costs can be reduced, and the manufacture of the lower limb load absorption mechanism 35 is facilitated.

In the footrest part 36 shown in FIG. 5, when the lower limb load absorption mechanism 35 deforms due to a load, the cushioning boss 73 of the mat part 72 makes contact with the plate 48 of the footrest base member 34 and deforms, whereby impact applied to the leg F can be cushioned.

The footrest for a vehicle according to the present invention is used in an automobile in the present embodiment, but can also be used in a scooter or other two-wheeled vehicle.

The footrest for a vehicle is used in a driver's seat in the present embodiment, but application can also be made to a passenger seat.

In the footrest for a vehicle, the tunnel connection part 47 is mounted on the dashboard tunnel part 27, but the tunnel connection part 47 may also be mounted on the center tunnel part 26.

INDUSTRIAL APPLICABILITY

A footrest for a vehicle according to the present invention is advantageous for a driver's seat of a vehicle.

The invention claimed is:

1. A footrest for a vehicle, comprising:
a footrest part for making contact with a foot of a vehicle occupant;
a footrest base member for supporting the footrest part on a front partition of a passenger compartment, the footrest base member having one end part adapted to be mounted on a vehicle structure and an opposite end part continuing from the one end part,
a front surface load absorption mechanism adapted to connect the opposite end part of the footrest base member to the front partition so as to absorb a load applied to the front partition; and
a lower limb load absorption mechanism for supporting the footrest part on the opposite end part of the footrest base member and absorbing a load applied from the vehicle occupant to the footrest part,
wherein the front surface load absorption mechanism comprises a center connection part adapted to be connected to the front partition and three stay parts rising in three directions from a peripheral edge of the center connection part, each of the three stay parts being coupled to the footrest base member.

2. A footrest for a vehicle, comprising:
a footrest part for making contact with a foot of a vehicle occupant;
a footrest base member for supporting the footrest part on a front partition of a passenger compartment, the footrest base member having one end part adapted to be mounted on a vehicle structure and an opposite end part continuing from the one end part,
a front surface load absorption mechanism adapted to connect the opposite end part of the footrest base member to the front partition so as to absorb a load applied to the front partition; and
a lower limb load absorption mechanism for supporting the footrest part on the opposite end part of the footrest base member and absorbing a load applied from the vehicle occupant to the footrest part,
wherein the lower limb load absorption mechanism comprises two brackets each having a pair of leg parts formed in a V-shape, the leg parts being interposed between the footrest base member and the footrest part and having elasticity so as to absorb a load.

* * * * *